Figure 3:
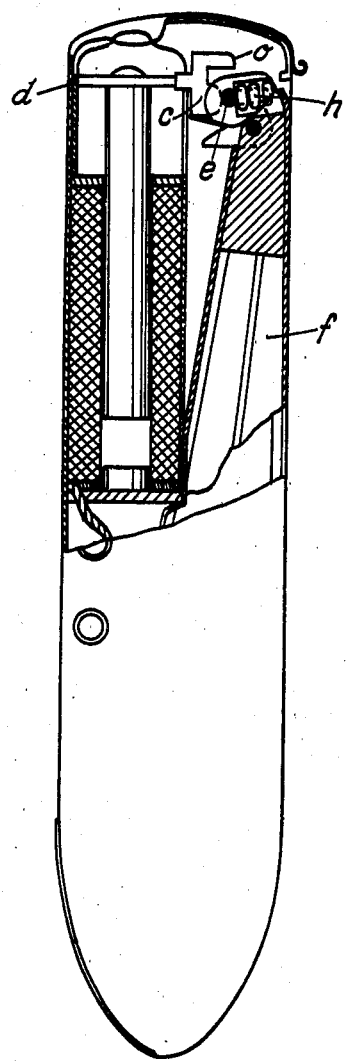

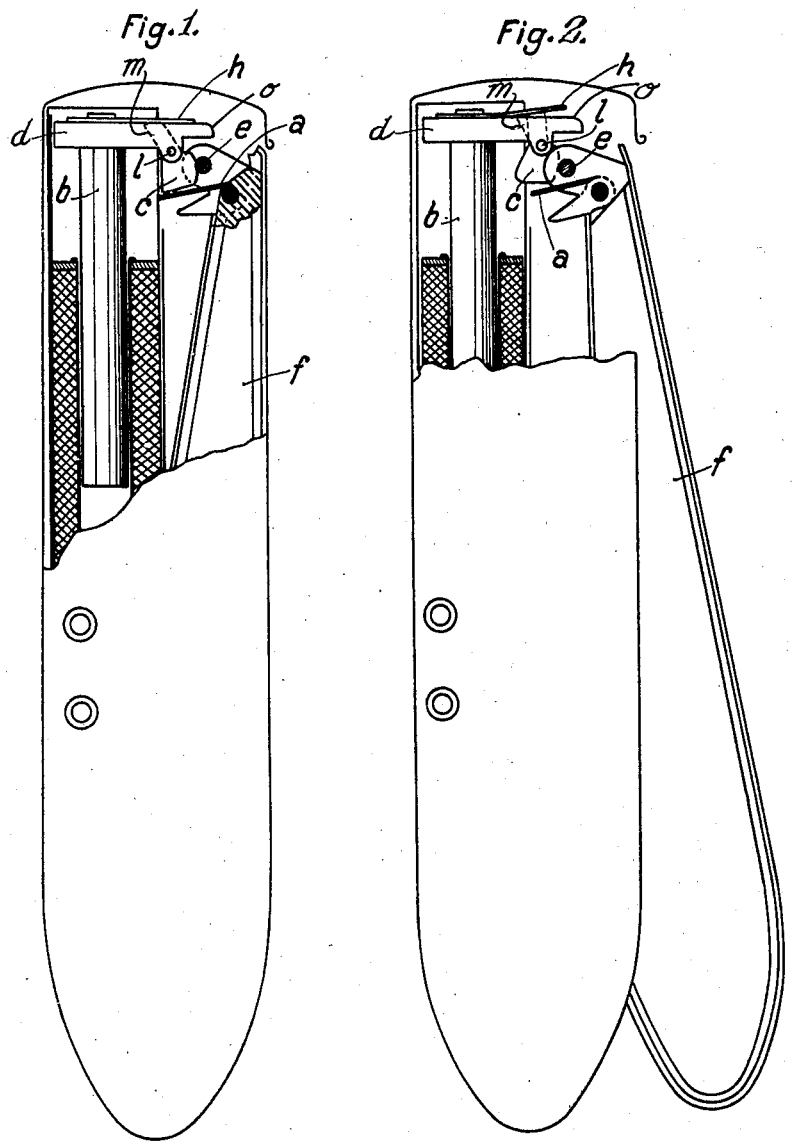

Aug. 27, 1935.   R. HEINEMANN   2,012,667
VEHICLE DIRECTION INDICATOR
Filed Nov. 20, 1930   2 Sheets-Sheet 2

Inventor:
R. HEINEMANN
PER:- Sydney E. Pap.
Attorney.

UNITED STATES PATENT OFFICE 2,012,667

VEHICLE DIRECTION INDICATOR

Rudolf Heinemann, Berlin-Wilmersdorf, Germany

Application November 20, 1930, Serial No. 496,966
In Germany January 27, 1930

2 Claims. (Cl. 177—329)

Electro-magnetic direction indicators, particularly for motor vehicles or the like, are known in which an indicating arm is so locked in the normal position that vibration to which the arm is subjected by the vehicle does not cause it to swing out of the housing. Such devices have the advantage that the arm only moves out of the housing when it is definitely operated in order to indicate the change in the direction of travel, but on the other hand they have the disadvantage that without the operation of the electro-magnet, e. g. on a failure of the electric current or the like, it is difficult to raise the indicator arm manually. The majority of users attempt to force the indicator arm into the raised position in order to reach the electro-magnet which in the normal position is covered by the indicator. This frequently results in damage and it is usually necessary to remove the indicator from the vehicle, and by forcibly shaking it to cause the indicator arm to swing out, that is to say, to allow the magnets to drop.

It is the object of the present invention to provide an improved form of indicator, wherein the locking means which retain the indicating arm in the housing against movement due to vibration may be released by hand as well as by the electro-magnet so that in case of failure of the latter, the indicating arm may be manually raised or swung out of the housing.

The features of the invention will be further described with reference to the accompanying drawings, in which:—

Fig. 1 shows an indicator according to the invention partly in section having a spring controlled abutment, Fig. 2 shows an indicator arm partly opened, and Fig. 3 shows an indicator arm partly in section in which the stop is yieldingly secured on the indicator arm.

In Figs. 1 and 2 the electrical actuating system for the indicator arm comprises the armature $b$ extending within a solenoid coil and having a head plate $d$ on which is formed an actuating member $o$ and a locking member in the form of an abutment $c$ pivoted at $l$ on the head plate $d$ and having a tail $m$ controlled by a leaf spring $h$ carried by the said head plate $d$. On the indicator arm $f$ is a stop pin $e$ positioned above and to one side of the pivot of the said arm $f$ so as to be controlled by the said abutment $c$ in a direction at right angles to the axis of the solenoid $b$ when in closed position. The indicator arm $f$ is maintained in its position of rest by the pin $e$ resting on the abutment $c$. The abutment $c$ by means of the tail $m$ is maintained in its locking or holding position by the leaf spring $h$, the power of this spring being so proportioned that it holds the locking member $c$ in its locking position engaging the stop $e$ against ordinary vibration so that the signal arm $f$ cannot swing out of the housing. If, on the other hand, force is exerted to raise the indicator arm in excess of a predetermined amount, then the locking member $c$ comes into the position shown in Fig. 2, that is to say, the spring $h$ is displaced or is bent, and the signal arm can be raised. A leaf spring $a$ serves to brake the signal arm $f$ as it falls.

Thus in this construction the indicator arm is held in its normal position against vibration by a yielding or resilient connection between the head plate of the armature and the arm.

In the construction according to Fig. 3 the principle is similar, but the locking stop $e$ is pivoted to the signal arm $f$ and subjected to the action of a coil spring $h$ instead of the member $c$ being yieldingly connected to the armature.

The construction according to Figs. 1 and 2 and the construction according to Fig. 3 may also be combined.

It will thus be seen that the present invention presents very simple means for releasing the lock on the indicator arm so as to permit the latter to be manually raised, for example, in the case of a failure in the electrical system.

What I claim is:—

1. In a direction indicator the combination of a casing, an indicating arm pivoted at the upper end of the casing and having a solenoid and a core with respect to the axis of which solenoid the indicating arm is normally parallel, a head plate on the core, an abutment pivoted to the head plate, a pin connected to the said indicating arm arranged above and towards the solenoid side of the pivot of the said arm and engaging the said abutment in a direction substantially at right angles to the axis of the solenoid, whereby the arm is normally retained against movement due to vibration, but can be gripped by the hand and swung out of the casing, spring means adapted to return the abutment and the pin to retaining position when the arm closes, and an actuating member secured to the core and normally spaced away from the pin, whereby initial movement of the core moves the abutment clear of the pin and releases the arm, while further movement of the core causes the actuating member to engage the pin and consequently swing the arm out of the casing.

2. In a direction indicator the combination of a casing, an indicating arm pivoted at the upper end of the casing, a solenoid disposed within the casing and having a core with respect to which the indicating arm is normally parallel, a head plate carried by the core and having an abutment thereon pivoted on the said head plate, a spring carried by the said head plate, a tail on the abutment controlled by the said spring, a spring on the pivot of the arm engaging the abutment when the arm falls, a pin connected to the said indicating arm arranged above and towards the solenoid side of the pivot of said arm, so as to be controlled by the said abutment in a direction substantially at right angles to the axis of the solenoid when in closed position, whereby the arm is normally retained against movement due to vibration, but can be gripped by the hand and swung out of the casing, and an actuating member carried by the head plate and normally spaced away from the pin, whereby initial movement of the solenoid moves the abutment clear of the pin and releases the arm, while further movement of the solenoid causes the actuating member to engage the pin and consequently swing the arm out of the casing.

RUDOLF HEINEMANN.